(12) United States Patent
Picker et al.

(10) Patent No.: US 11,673,210 B2
(45) Date of Patent: Jun. 13, 2023

(54) METHOD FOR PRODUCING AN AXLE HOUSING OF A VEHICLE AXLE, AND AXLE HOUSING OF A VEHICLE AXLE

(71) Applicant: BPW Bergische Achsen KG, Wiehl (DE)

(72) Inventors: Heinrich Picker, Hückeswagen (DE); Katarzyna Giantsios, Hachenburg (DE)

(73) Assignee: BPW Bergische Achsen KG, Wiehl (DE)

( * ) Notice: Subject to any disclaimer, the term of this patent is extended or adjusted under 35 U.S.C. 154(b) by 466 days.

(21) Appl. No.: 16/603,372

(22) PCT Filed: Apr. 3, 2018

(86) PCT No.: PCT/DE2018/100293
§ 371 (c)(1),
(2) Date: Oct. 7, 2019

(87) PCT Pub. No.: WO2018/188688
PCT Pub. Date: Oct. 18, 2018

(65) Prior Publication Data
US 2021/0086301 A1      Mar. 25, 2021

(30) Foreign Application Priority Data

Apr. 10, 2017   (DE) .................. 10 2017 107 725.1

(51) Int. Cl.
*B23K 26/282*   (2014.01)
*B23K 26/348*   (2014.01)
(Continued)

(52) U.S. Cl.
CPC .......... *B23K 26/282* (2015.10); *B23K 26/348* (2015.10); *B23K 26/3576* (2018.08);
(Continued)

(58) Field of Classification Search
CPC ............ B23K 26/0823; B23K 26/0869; B23K 26/348; B23K 26/3576; B23K 26/60;
(Continued)

(56) References Cited

U.S. PATENT DOCUMENTS

| 2004/0185946 A1* | 9/2004 | Gustafsson | ........... B60B 35/166 464/179 |
| 2007/0119829 A1 | 5/2007 | Vietz et al. | |

(Continued)

FOREIGN PATENT DOCUMENTS

| CN | 104 907 696 | 9/2015 |
| CN | 105 108 340 | 12/2015 |

(Continued)

*Primary Examiner* — Dana Ross
*Assistant Examiner* — Kuangyue Chen
(74) *Attorney, Agent, or Firm* — Gudrun E. Huckett

(57) ABSTRACT

The invention relates to a method for producing an axle housing of a vehicle axle, by means of integrally connecting an axle tube (1) to an axle shaft (2) which is positioned on the longitudinal axis (L) of the axle tube, is equipped with bearing surfaces (3) for mounting a vehicle wheel, and has a tube cross-section facing said axle tube (1) which is substantially the same as the tube cross-section of the axle tube. In order to develop a welding method for the production of an axle housing that consists of an axle tube and an axle shaft secured thereto, which method is optimised in terms of the dynamic loads to which the axle housing is typically subjected in a driving operation, the method comprises the following steps: •—arranging the axle tube (1) and the axle shaft (2), with the abutting surfaces of their tube cross-sections positioned coaxially to one another, in a workpiece receiving portion of a welding installation (10), said welding installation additionally comprising an arc welding device (11) and a laser welding device (12) which is operated in parallel, •—continuously miming a weld seam (20) in the peripheral direction of the tube cross-sections, (Continued)

both welding devices (11, 12) being directed, actively and from the outside, onto substantially the same peripheral section of the abutting surfaces, wherein the laser beam (S) meets the outside (14) of the tube at right angles, and intersects the longitudinal axis (L) of the axle tube (1), and
• —stopping running the weld seam (20) once this has passed over a peripheral angle of at least 360°. A corresponding axle housing is also disclosed.

8 Claims, 4 Drawing Sheets

(51) Int. Cl.
  *B23K 26/60* (2014.01)
  *B23K 35/30* (2006.01)
  *B23K 26/352* (2014.01)
  *B60B 35/00* (2006.01)
  *B23K 101/06* (2006.01)
  *B23K 101/00* (2006.01)
  *B23K 26/03* (2006.01)
  *B23K 26/06* (2014.01)
  *B23K 26/08* (2014.01)
(52) U.S. Cl.
  CPC .......... *B23K 26/60* (2015.10); *B23K 35/3033* (2013.01); *B60B 35/00* (2013.01); *B23K 26/03* (2013.01); *B23K 26/0665* (2013.01); *B23K 26/0823* (2013.01); *B23K 26/0869* (2013.01); *B23K 2101/006* (2018.08); *B23K 2101/06* (2018.08); *B60B 2310/3026* (2013.01)
(58) Field of Classification Search
  CPC .............. B23K 26/282; B23K 35/3033; B23K 2101/006; B23K 26/0665; B23K 26/03; B23K 2101/06; B60B 35/08; B60B 35/16; B60B 2310/3026; B60B 2310/302; B60B 35/04; B60B 35/00; F16C 3/023; F16C 41/008
  See application file for complete search history.

(56) References Cited

U.S. PATENT DOCUMENTS

| | | | |
|---|---|---|---|
| 2007/0132307 A1 | 6/2007 | Fahrentholz et al. | |
| 2008/0245777 A1* | 10/2008 | Cremerius | ............. B23K 26/40 |
| | | | 219/121.64 |
| 2010/0013295 A1 | 1/2010 | Spielmann et al. | |
| 2010/0276402 A1 | 11/2010 | Richard et al. | |
| 2012/0187096 A1 | 7/2012 | Schmid et al. | |
| 2014/0124481 A1 | 5/2014 | Yano et al. | |
| 2017/0120675 A1* | 5/2017 | Chung | .................. B60B 35/125 |
| 2018/0297400 A1* | 10/2018 | Carroll | ...................... B23P 6/00 |

FOREIGN PATENT DOCUMENTS

| | | |
|---|---|---|
| DE | 10 2010 028 745 | 11/2011 |
| EP | 0 941 783 | 9/1999 |
| EP | 1 557 234 | 7/2005 |
| EP | 1 837 098 | 9/2007 |
| EP | 2 133 164 | 12/2009 |
| RU | 2355539 | 1/2008 |
| RU | 2403135 | 7/2009 |
| RU | 2458768 | 8/2012 |
| RU | 2481926 | 2/2013 |
| RU | 2552826 | 5/2015 |
| WO | 2005/018956 | 3/2005 |

* cited by examiner

METHOD FOR PRODUCING AN AXLE HOUSING OF A VEHICLE AXLE, AND AXLE HOUSING OF A VEHICLE AXLE

BACKGROUND OF THE INVENTION

The invention relates to a method for producing an axle housing of a vehicle axle by integrally connecting an axle tube to an axle stub, arranged on the longitudinal axis of the axle tube, which is provided with mounting surfaces for the mounting of a vehicle wheel and has a tube cross-section, facing the axle tube, which is essentially the same as the tube cross-section of the axle tube.

The invention moreover relates to an axle housing of a vehicle axle, which can preferably be produced using such a method, comprised of an axle tube and an axle stub, provided with mounting surfaces for the mounting of the respective vehicle wheel, which has a tube cross-section, facing the axle tube, which is essentially the same as the tube cross-section of the axle tube, and wherein the two tube cross-sections are positioned against each other and connected to each other integrally via a weld seam.

An axle housing produced by welding is described as a possible embodiment in EP 2 133 164 B1. Wheel receiving sections, which are generally also referred to as axle stubs, are fastened on a central axle tube at both its ends. The tube cross-sections of the wheel receiving sections are the same in the connecting region as the tube cross-sections of the central axle tube. The connection is made using a welding method, wherein EP 2 133 164 B1 makes particular mention of a friction welding process. However, it is also known from the prior art to employ a conventional arc welding method for the integral connection of the axle stub.

Especially when they are used as axles for commercial vehicles, axle housings are subject to high dynamic bending loads in addition to the braking-induced torsional loads. The loading situation that prevails here in the axle housing differs in the upper side of the axle housing, where in particular compressive loads prevail, in comparison with the lower side of the axle housing, where in particular tensile loads are applied. Both conventional welding methods and the friction welding process do not take account of these different loading situations. This disadvantage is only partially overcome by it being possible for such an axle housing to be installed in the axle structure in any desired rotated position, i.e. with no distinction as to which circumferential section of the axle housing is situated at the bottom in the region of the in particular tensile loads and which circumferential section is situated at the top in the region of the in particular compressive loads. However, this advantage is only a putative one because for many axle housings the rotated position is determined anyway by mounted parts such as, for example, brake carriers and needs to be observed when mounting the axle.

Against the background of this situation, the object of the invention is, for the purpose of producing an axle housing comprised of an axle tube and an axle stub fastened thereon, to develop a welding method which is optimized with respect to the vehicle dynamic loads to which the axle housing is typically exposed during driving. It is furthermore intended to provide a corresponding axle housing that is suitable in particular for a commercial vehicle axle.

SUMMARY OF THE INVENTION

In order to achieve this object, a production method is proposed having the features described at the beginning and which is characterized by the following method steps:

arranging the axle tube and the axle stub with contact surfaces, positioned coaxially opposite each other, of their tube cross-sections in a workpiece holder of a welding assembly, wherein the welding assembly moreover comprises an arc welding device and a laser welding device which is operated in parallel, continuously running a weld seam in the circumferential direction of the tube cross-sections, wherein both welding devices are directed actively and from outside onto essentially the same circumferential section of the contact surfaces, and wherein the laser beam strikes the outside of the tube at right angles and preferably intersects the longitudinal axis of the axle tube, completing the running of the weld seam after it has been guided over a circumferential angle of at least 360° and preferably over 360° to 370°.

An axle housing of a vehicle axle is moreover proposed which can be produced using this method. Such an axle housing consists of an axle tube and at least one axle stub which is provided with mounting surfaces for the mounting of the respective vehicle wheel and has a tube cross-section, facing the axle tube, which is essentially the same as the tube cross-section of the axle tube. The two tube cross-sections are positioned against each other and connected integrally to each other via a weld seam, wherein the weld seam extends from the outside of the tube cross-sections to a weld seam root arranged on the inside of the tube cross-sections and the weld seam extends over the whole circumference of the axle housing with a first weld seam section passing over approximately half of the circumference and a second weld seam section passing over the remainder of the circumference, and wherein the weld seam root has a ridge of melted material, projecting from the interior of the tube, on the inside of the tube along the first weld seam section, and has a seam which is smoothed in comparison along the second weld seam section.

An essential aspect of the invention is the use of a dual welding method by combining a conventionally designed arc welding device with a laser welding device which is operated in parallel, i.e. simultaneously. In addition, both welding devices work from outside on approximately the same circumferential section of the axle housing. The beam direction of the laser beam is such that the laser beam is perpendicular to the longitudinal extent of the axle tube and it consequently strikes the longitudinal extent of the outside of the tube at right angles. It preferably intersects the longitudinal axis of the axle tube.

A further particular feature is that, although a weld seam is run over the whole circumference, the remaining secondary energy of the laser beam is additionally used on only part of the circumference, which is approximately half of the total circumference, for the purpose of reworking the weld seam on the inside of the tube which tends to form a distinct root. The energy (secondary energy) of the laser beam remaining on the inside of the tube is used to remove, smooth, and even out the ridge of melted material which occurs in the region of the weld seam root. The weld seam root is consequently smoothed here, which further improves the integral connection between the two tube ends and reduces notch effects in order thus to be able to withstand tensile loads particularly well.

As a result, after completion of the running of the weld seam, which occurs after a circumferential angle of between 360° and 370° has been reached, a first partial circumference, which is characterized at the weld seam root by a readily discernible ridge of melted material, is present on the inside of the tube, as is a second partial circumference on which the inside of the tube is comparatively smoother. Trials have shown that the quality of the welded joint is further improved on the second circumferential segment, i.e. the one which is smoothed on the inside of the tube by means of the laser beam. The axle housing is therefore installed in the chassis and in particular commercial vehicle chassis such that the second circumferential segment is situated at the bottom during driving and is thus arranged at a point where the critical tensile loads primarily prevail.

As a whole, a welding method is therefore achieved for producing an axle housing comprised of an axle tube and an axle stub fastened thereon which is optimized with respect to the typical vehicle dynamic loads to which the axle housing is exposed during driving.

During the subsequent assembly of the axle housing in the commercial vehicle chassis, in order to ensure an installed position which is optimized in terms of loading, the axle housing can be provided on the outside with at least one marking which is clearly associated with the partial circumference on which the first unsmoothed weld seam section is situated, and/or with the partial circumference on which the second smoothed weld seam section is situated. Such a marking, as a word or symbol, can, for example, represent "up" and "down" in order to provide the fitter with installation instructions when fitting the axle.

BRIEF DESCRIPTION OF THE DRAWINGS

Other advantages and details are explained below with the aid of an exemplary embodiment. Reference is made here to the drawings, in which.

DESCRIPTION OF PREFERRED EMBODIMENTS

Figure 1:
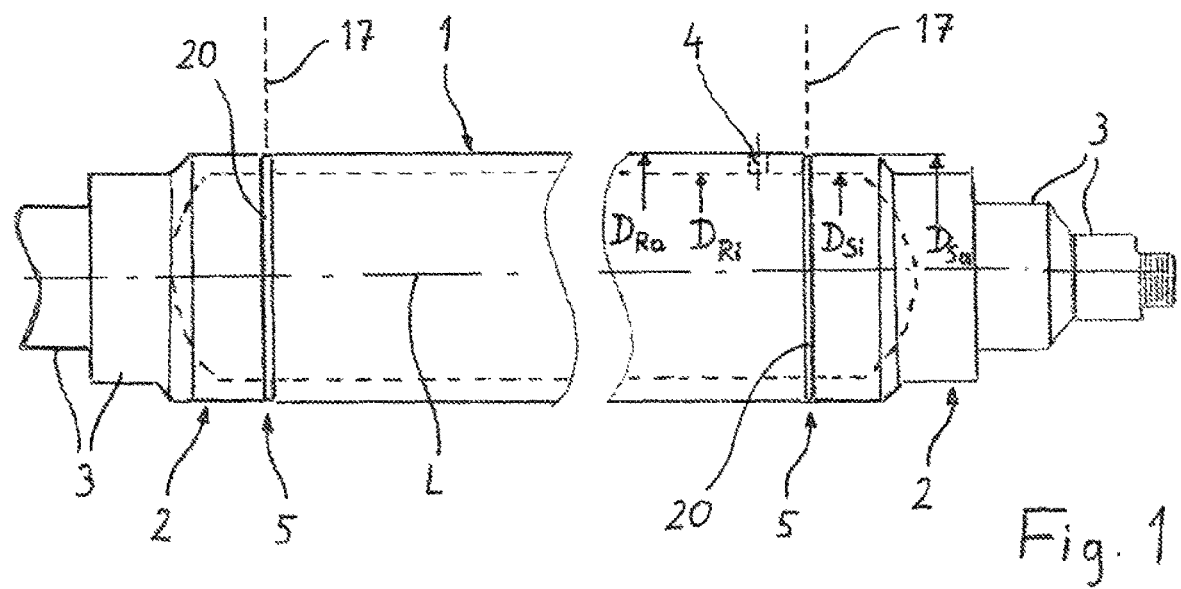
FIG. 1 shows an axle housing in a highly shortened view, as used in a non-driven commercial vehicle axle of a commercial vehicle trailer.

The axle housing depicted in FIG. 1, here configured as a continuous axle housing for a non-driven commercial vehicle axle, consists of a total of three longitudinal sections. An axle tube 1 made of steel forms the central longitudinal section. In each case one axle stub 2 is fastened to both open ends of the axle tube 1 by means of a welding method which is described in detail below. Each axle stub 2 is preferably made of steel and is provided with mounting surfaces 3 for mounting components, for example for the roller bearings of the respective vehicle wheel and/or for mounting a brake drum of a disk brake. A brake carrier of a drum brake or a disk brake can moreover be fastened to the axle stub 2.

The length of the axle tube 1 is set by sawing. The saw cut is made at right angles to the longitudinal extent of the axle tube. This results in a sawed contact surface which is suitable for the subsequent welding process without any further treatment.

As preparation for welding, the axle tube 1 is moreover provided with a bore 4 of preferably 4 to 10 mm. The bore 4 connects the interior of the axle tube to the outside. It serves as a ventilation opening for welding gases that occur during the welding process.

The bore 4 is no longer required on the later finished product. It is therefore sealed later so that moisture and dirt cannot get into the interior of the axle tube. The bore or the ventilation opening 4 can be made in the axle stub 2 instead of the axle tube 1.

Each axle stub 2 also has a tube cross-section on its end facing the axle tube 1. This tube cross-section is essentially the same as the tube cross-section of the axle tube 1 and is arranged on the same longitudinal axis L. Because the axle stub 2 is a cast or forged part, the open tube cross-section of the axle stub 2 is prepared by a machining method such as, for example, by turning. The annular end surface of the axle stub 2 is thus a surface which is prepared in a machining method.

The axle stub 2 is provided with bores for subsequent fastening of an ABS holder even before the welding process.

If, as shown, the two tube cross-sections are round, the internal diameter $D_{Si}$ of the tube cross-section on the axle stub 2 is approximately the same as the internal diameter $D_{Ri}$ of the axle tube 1. The external diameter $D_{Sa}$ of the tube cross-section on the axle stub 2 is likewise approximately the same as the external diameter $D_{Ra}$ of the axle tube 1.

In the joint region 5, the tube cross-sections involved are integrally connected and hence the axle stub 2 is permanently fastened to the respective end of the axle tube 1. The connection takes place with the aid of a dual welding method. In order to perform said method, the welding assembly 10 used has a workpiece holder (not illustrated in FIG. 2) in which the axle tube end and the axle stub 2 can be fixed on the longitudinal axis L in a coaxial orientation, and moreover by means of an arc welding device 11 and lastly by means of a laser welding device 12 which can be operated in parallel, i.e. simultaneously.

The two welding devices 11 and 12 are preferably fastened on a common workpiece carrier relative to which the workpiece holder can be rotated about the longitudinal axis L of the axle housing.

The axle tube end and the axle stub 2 are first tack-welded in their coaxial orientation to the contact surfaces involved. The tack welding takes place at at least three tack-welding points, and preferably six tack-welding points, distributed over the circumference.

Figure 2:
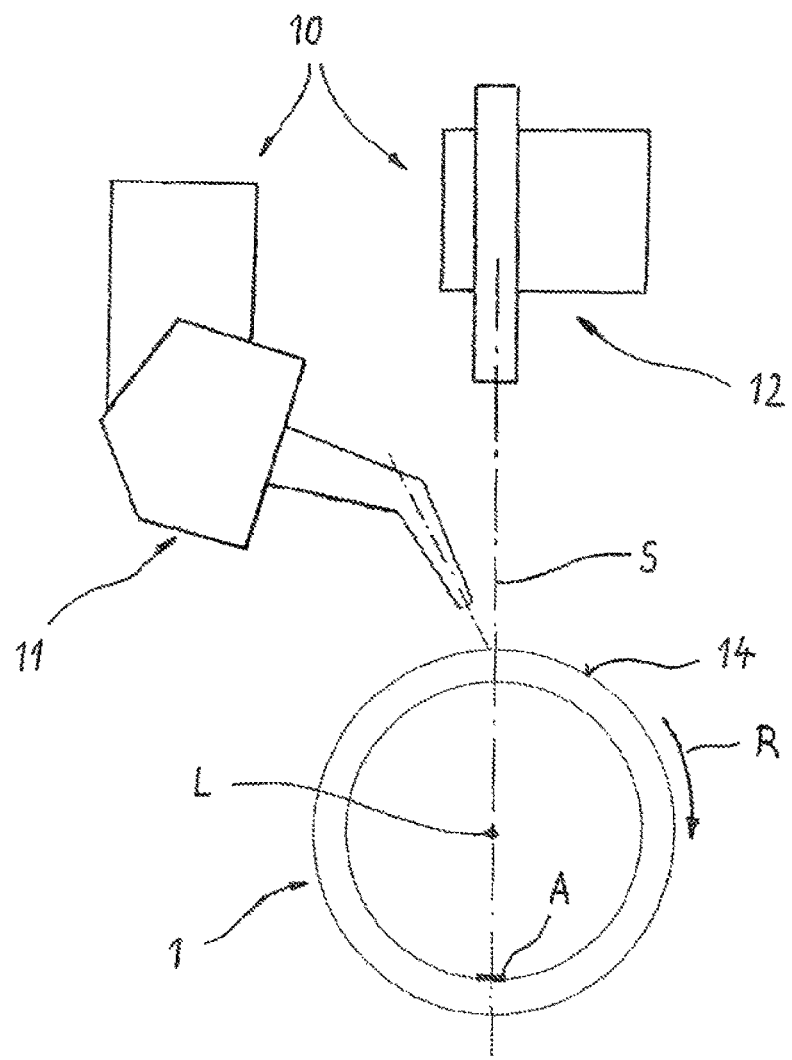
FIG. 2 shows, in a highly simplified overview, a dual welding assembly for producing the axle housing, the individual objects being shown in the welding plane.
Figure 2A:
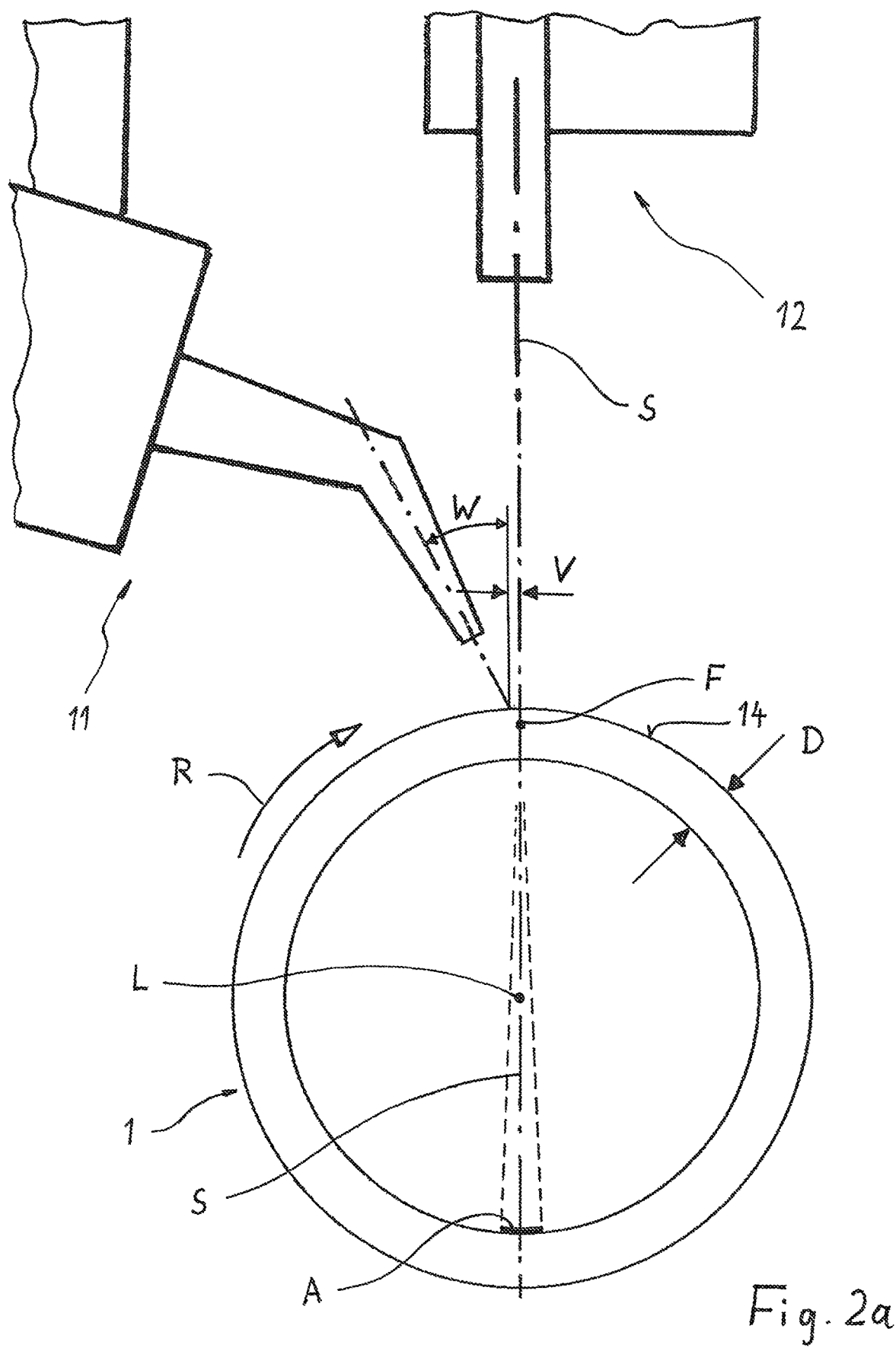
FIG. 2a shows the objects according to FIG. 2 with additional details.

According to FIG. 2, the arc welding device 11 and the laser welding device 12 are oriented approximately in the same welding position from the outside against the opposing contact surfaces of the two tube cross-sections which are to be connected. However, the two working axes are preferably configured such that the treatment location of the arc welding device 11 is in advance of the location at which the laser beam S simultaneously strikes the tube outside 14, wherein the advance V is preferably no more than 5 mm, and particularly preferably no more than 3 mm.

The energy beam S of the laser welding device strikes the outside 14 of the tube cross-sections at right angles. The beam direction of the laser beam S is such that the laser beam S is perpendicular to the longitudinal extent of the axle tube 1 and it consequently, according to FIG. 4, strikes the longitudinal extent of the tube outside 14 at right angles.

Figure 4:
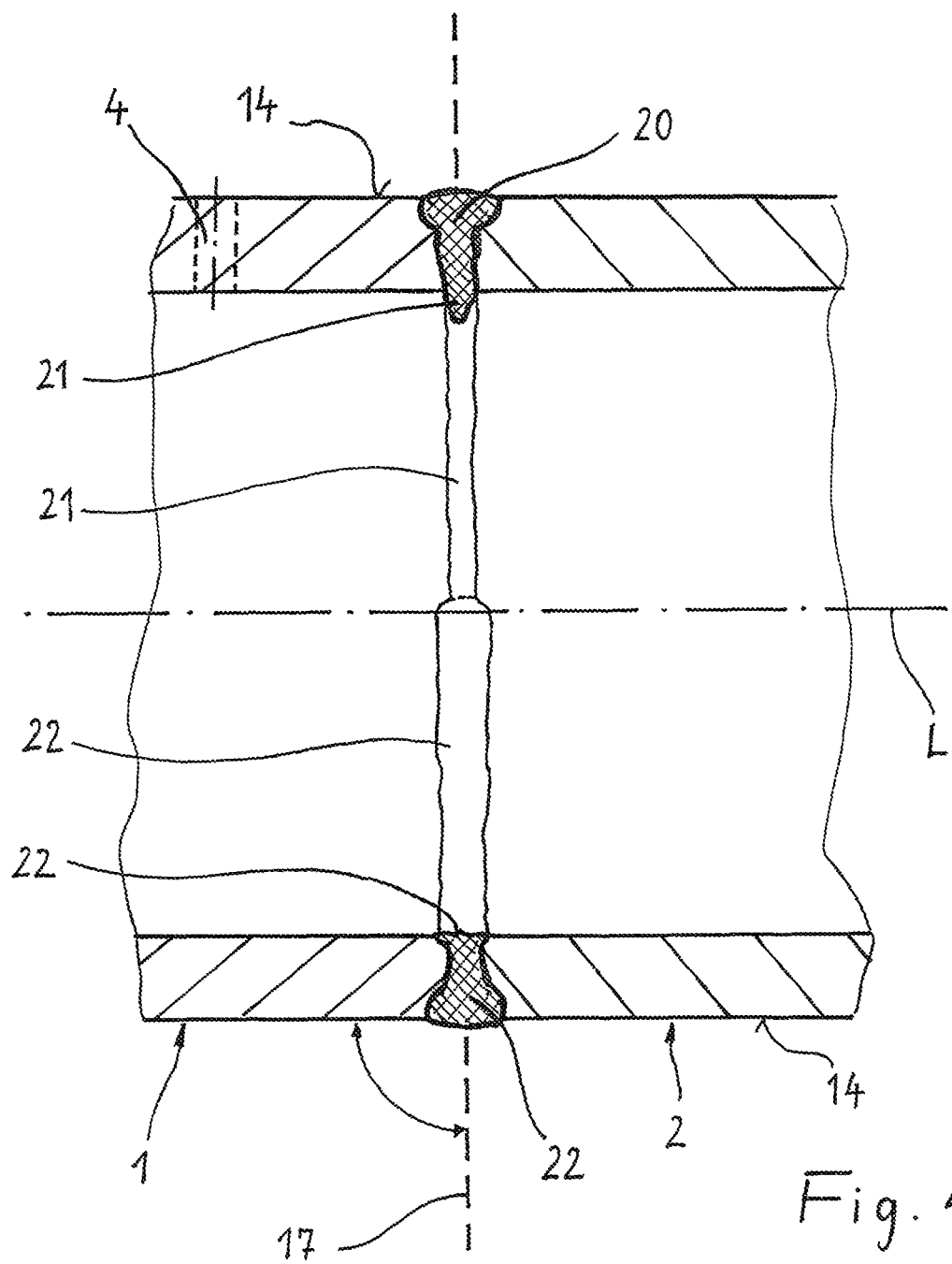
FIG. 4 shows a cross-section through the axle housing along its longitudinal extent, here in the region of the welded joint produced between the axle tube and the axle stub.

The working axis of the arc welding device 11 has an angle W with respect to the axis S of the energy beam of the laser which is 25° to 30° with respect to the axis S of the energy beam, and preferably 27°. However, both axes, i.e. the working axis of the arc welding device 11 and the axis S of the energy beam of the laser, are situated in the welding plane 17 defined by the contact surfaces of the tube ends (FIG. 4). The axis S of the laser beam preferably intersects the longitudinal axis L of the axle tube 1 at right angles.

The arc welding device 11 is designed, for example, for performing a MAG (metal active gas) welding method and operates preferably with an electronically controlled pulse current source. The welding device generates an arc between the preferably nickel-containing welding wire, fed in from outside, and the outside 14 of the connecting region 5. The arc welds the contact surfaces to the tube ends and the fed-in welding wire, the weld seam 20 being created. This process goes to a depth of only approximately 4 mm. During the welding process, a wire feeder feeds the welding wire continually through the welding torch to the welding point. The welding torch moreover supplies the weld seam 20 with the metal active gas involved in the welding process.

The welding wire should be a nickel alloy one with a 1.5 to 5% nickel content and preferably 2 to 3% percent by volume.

However, the arc welding device 11 can also be configured for other welding methods which use a welding wire.

The laser welding device 12 is preferably a fiber laser. However, the connecting method can also be performed using a diode laser with pulsed diodes. The laser welding device operates with an energy beam with a high energy density which is focused on a specific focal point. This focus F is preferably situated at a location which lies between the tube outside 14 and a third of the wall thickness D of the axle tube 1. The focus F is therefore preferably situated at a location which is at a smaller distance from the tube outside 14 than from the tube inside.

The width of the laser bean initially tapers, from where it emerges from the laser welding device 12 to the focus F. After the focus F, the laser beam widens again such that energy from the laser beam strikes the opposite tube inside at a surface A. The melting energy which is thus available on the opposite tube inside in the zone A is very important as part of the method described here.

Figure 3A:
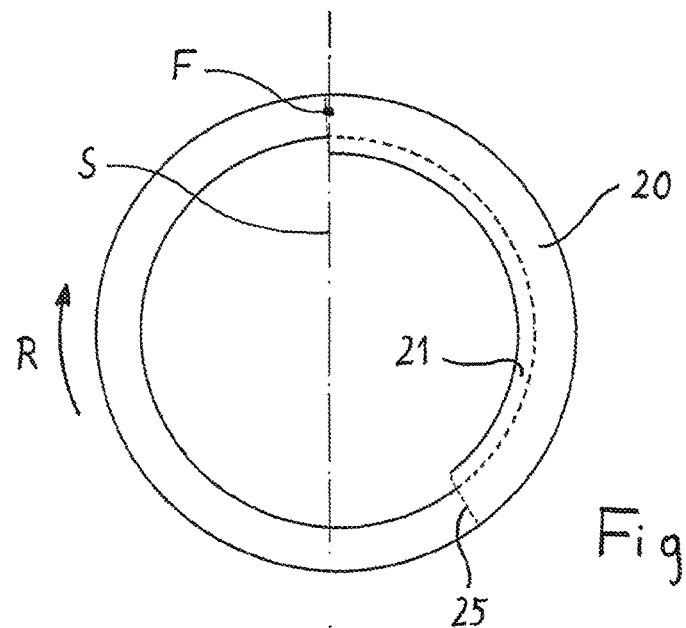
FIGS. 3a-3c show individual method stages of the welding process in the welding plane.

FIG. 3a shows the situation in the first part of the procedure. As a result of parallel, i.e. simultaneous operation of both welding devices 11, 12, the weld seam in FIG. 3a is already run over a partial circumference which is approximately a third of the total circumference. The starting position of the welding, i.e. the start of the already run weld seam 20, has the reference numeral 25. The direction of rotation of the workpiece comprised of the axle tube 1 and axle stub 2 relative to the welding devices is referenced with the arrow R. A zero gap sensor is used for the accuracy of the process. This guides and positions the welding processes.

The weld seam 20 is continuous in the radial direction, as shown in the upper part of the longitudinal section in FIG. 4. Melted material thus extends from the tube outside 14 to the weld seam root on the tube inside. The energy of the laser assists the formation of the weld seam 20. At the same time, part of the laser energy reaches as far as the internally opposite zone A as secondary energy. This zone A is therefore already preheated, which has a positive effect on the microstructure and specifically the hardness profile.

However, running the weld seam 20 has the consequence that material is raised on the tube inside. A weld seam root in the form of a ridge 21 of melted material is formed here which projects significantly into the tube interior 15 in the manner of an unevenly shaped rib.

The dual welding method, in which the weld seam is formed using the arc welding method, is responsible for forming the weld seam 20 but it is assisted by the energy applied by means of the laser beam (primary energy of the laser beam). This energy results in homogenization and improves the structure of the weld seam as a whole. In particular, the latter has a clean, flat seam surface on the tube outside.

Figure 3B:
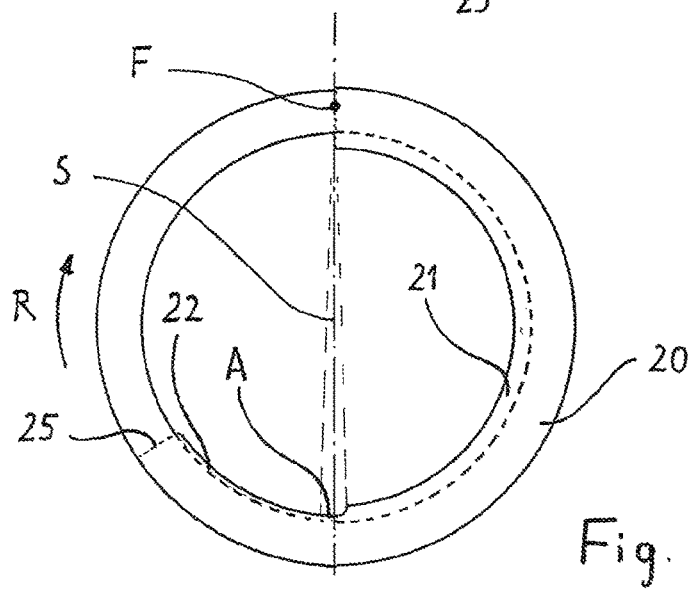

FIG. 3b shows a more advanced stage of the method, in which the weld seam 20 already extends over a circumferential segment which is approximately two-thirds of the total circumference.

As soon as the weld seam is run over a circumferential angle of 180°, as shown at the bottom in FIG. 3b, the ridge 21 comprised of melted material of the root reaches into the region of that area A which is affected by the energy of the laser beam S beyond its focus F, i.e. by the secondary energy of the laser beam. The energy density in the zone A is still sufficient to melt and break down the ridge 21 and homogenize the zone around the ridge such that a smoothed root 22 results. The advantage of the weld seam root 22 smoothed in this way is an improvement to the material structure and hence to the quality of this section of the weld seam.

Figure 3C:
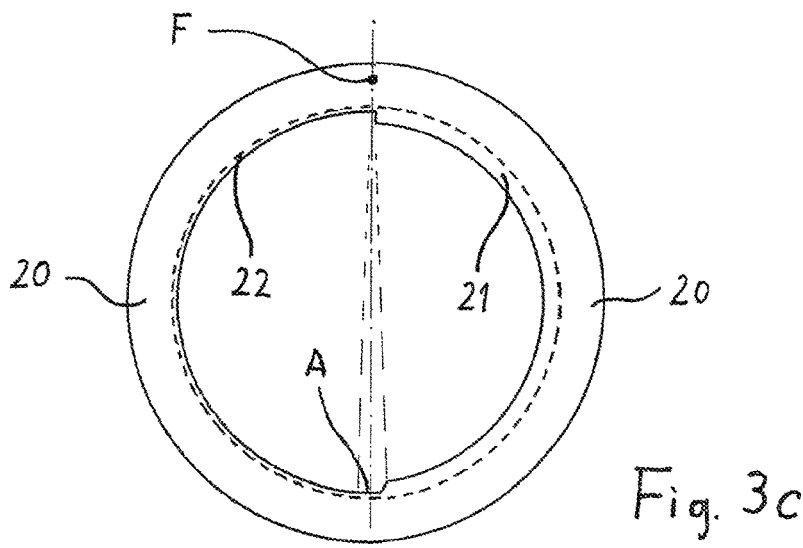

Lastly, FIG. 3c shows the situation at the completion of the welding method. The weld seam 20 is run over 360° to 370° and preferably over a circumferential angle of 365°. This process takes approximately 15 seconds. Two circumferential segments or partial circumferences of approximately the same size result. The circumferential segment which is welded only later and is shown on the right-hand side in FIG. 3c has the inwardly projecting ridge 21 on the weld root. In contrast, the circumferential segment which is welded first and is shown on the left-hand side in FIG. 3c has undergone the smoothing of the ridge later owing to the energy density of the laser beam. The circumferential length welded only later here extends over a partial circumference of 170° to 180°, and the circumferential length welded first over a part circumference of 180° to 190°.

The gases which occur during the inert gas welding and could otherwise lead to an elevated pressure can escape from the tube interior via the already described ventilation opening 4. The latter is then sealed by a sealing element.

When used later in practise, the axle housing is installed in the vehicle axle and in particular the commercial vehicle axle such that the partial circumference with the smoothed weld seam root is situated at the bottom and is hence subjected to particularly critical tensile loads during driving. This rotated position of the axle housing, which needs to be ensured during subsequent mounting of the axle, is shown in longitudinal section in FIG. 4.

For correct mounting of the axle, the completed axle housing can be provided on the outside with at least one marking which can be clearly associated with the two circumferential sections or circumferential segments, i.e. with either the first circumferential section or circumferential segment and/or with the second circumferential section or circumferential segment. The marking should represent "up" or "down" in the form of words or symbols. For this purpose, the marking can be fastened on the outside of the axle housing or engraved permanently in its material.

Alternatively, the end crater remaining at the completion of the welding method can serve as a marking.

As a whole, an axle housing is provided which can be produced relatively quickly and with few manufacturing steps. The dual welding takes place only over a total angle of 360° or somewhat more than 360° and results on the outside of the tube ends in a clean, flat seam surface and takes places just "in one go". Nevertheless, two different circumferential sections result in which the weld root is formed differently on the inside of the connected tube ends.

Using the method, the two axle stubs 2 can simultaneously be welded to both axle tube ends as long as two welding assemblies 10 are also present. Treatment time is saved as a result.

However, if using just one welding assembly 10, first just one axle stub 2 is connected to the axle tube 1, and then the other.

The welding method described is therefore optimized in terms of the typical vehicle dynamic loading to which an axle housing is exposed during driving. Account is taken of the circumstance in which during driving the loading situation which exists in an axle housing is different in the upper half of the axle housing, where primarily compressive loads prevail in comparison to the lower half where primarily tensile loads prevail.

LIST OF REFERENCE SYMBOLS

1 axle tube
2 axle stub
3 mounting surface
4 bore, ventilation opening
5 connecting region
10 welding assembly
11 arc welding device
12 laser welding device
14 tube outside
17 welding plane
20 weld seam
21 ridge of melted material
22 smoothed weld seam root
25 starting welding position
A area, zone
D wall thickness
$D_{Ra}$ outer diameter
$D_{Ri}$ inner diameter
$D_{Sa}$ outer diameter
$D_{Si}$ inner diameter
F focus
L longitudinal axis of the axle housing
R direction of rotation
S laser beam
V advance
W angle between the welding devices

What is claimed is:

1. An axle housing of a vehicle axle comprised of an axle tube (1) and an axle stub, wherein the axle stub is provided with mounting surfaces (3) for the mounting of a respective vehicle wheel and has a first tube cross-section, facing the axle tube (1), wherein the axle tube (1) has a second tube cross-section that has the same cross-section shape as the first tube cross-section wherein the first and second tube cross-sections are positioned against each other and connected integrally to each other via a weld seam (20), wherein the weld seam (20) extends from the outside of the first and second tube cross-sections to an inside of the first and second tube cross-sections and extends completely over a circumference of the axle housing with a first weld seam section passing over approximately half of the circumference of the axle housing and a second weld seam section passing over the remainder of the circumference of the axle housing, and wherein the weld seam has a ridge (21) of melted material, projecting from the inside of the first and second tube cross-sections into the interior of the axle housing along the first weld seam section, and wherein the weld seam is homogenized and smoothed along the second weld seam section in comparison to the ridge (21) of melted material of the first weld seam section; wherein the first weld seam section and the second weld seam section are welded in a single path around the circumference in a welding operation, and wherein the second weld seam section is homogenized and smoothed at the inside of the first tube cross-section and of the second tube cross-sections in comparison to the ridge (21) of melted material of the first weld seam section by a secondary energy of the welding operation impinging on the inside of the first tube cross-section and the second tube cross-section opposite a welding location of the welding operation.

2. The axle housing as claimed in claim 1, characterized in that the first weld seam section passes over a circumferential length of 170° to 180°, and the second weld seam section over a circumferential length of 180° to 190°.

3. The axle housing as claimed in claim 1, characterized in that the axle housing is provided on the outside with at least one marking which can be clearly associated with the circumferential section on which the first weld seam section is situated, and/or with the circumferential section on which the second weld seam section is situated.

4. The axle housing as claimed in claim 3, characterized in that the marking is the end crater remaining at the completion of a welding method.

5. The axle housing as claimed in claim 3, characterized in that the marking, as a word or symbol, can represent "up" and/or "down".

6. The axle housing as claimed in claim 1, characterized in that the axle housing is provided with a ventilation opening (4) for the welding process.

7. The axle housing as claimed in claim 6, characterized in that the ventilation opening (4) is sealed by a sealing element.

8. The axle housing as claimed in claim 1, characterized in that the axle tube (1) and the axle stub (2) are additionally connected to each other via tack-welding points.

* * * * *